United States Patent [19]

Beck

[11] Patent Number: 5,760,795

[45] Date of Patent: Jun. 2, 1998

[54] SYSTEM AND METHOD FOR OVERRIDING A LOW MARKING MATERIAL STATUS IN A FACSIMILE ENVIRONMENT

[75] Inventor: John E. Beck, Pittsford, N.Y.

[73] Assignee: Xerox Corporation, Stamford, Conn.

[21] Appl. No.: 534,518

[22] Filed: Sep. 27, 1995

[51] Int. Cl.⁶ ............................. B41J 29/38; H04N 1/034
[52] U.S. Cl. ............................................... 347/3; 347/14
[58] Field of Search .............................. 347/3, 6, 17, 19, 347/7, 14; 358/296, 404

[56] References Cited

U.S. PATENT DOCUMENTS

| | | | |
|---|---|---|---|
| 3,409,901 | 11/1968 | Dost et al. | |
| 4,121,222 | 10/1978 | Diebold et al. | 346/75 |
| 4,202,267 | 5/1980 | Heinzl et al. | 101/564 |
| 4,368,478 | 1/1983 | Koto | 346/140 R |
| 4,468,112 | 8/1984 | Suzuki et al. | 355/14 D |
| 4,566,014 | 1/1986 | Paranjpe | 346/1.1 |
| 4,847,659 | 7/1989 | Resch, III | 355/202 |
| 4,908,666 | 3/1990 | Resch, III | 355/246 |
| 4,935,751 | 6/1990 | Hamlin | 346/140 R |
| 4,961,088 | 10/1990 | Gilliland et al. | 355/206 |
| 5,049,898 | 9/1991 | Arthur et al. | 347/19 |
| 5,204,698 | 4/1993 | Le Sueur et al. | 346/160 |
| 5,204,699 | 4/1993 | Birnhaum et al. | 346/160 |
| 5,206,668 | 4/1993 | Lo et al. | 346/140 R |
| 5,283,613 | 2/1994 | Midgley, Sr. | 355/203 |
| 5,315,397 | 5/1994 | Inoue et al. | 358/296 |
| 5,500,714 | 3/1996 | Yashiro et al. | 355/200 |

OTHER PUBLICATIONS

English Translation of Japanese Patent No. 3058854–A2.

*Primary Examiner*—N. Le
*Assistant Examiner*—Thinh Nguyen
*Attorney, Agent, or Firm*—Michael J. Nickerson

[57] ABSTRACT

A system overrides a low material mode in a facsimile environment. A transmitter initiates a transmission and transmits a job of image data. A receiver establishes the transmission and receives the job of image data. The receiver determines an amount of marking material available and produces a low material signal indicating a low marker material status when the amount of marking material is below a predetermined value. The receiver transmits a low marking material signal to the transmitter, and the transmitter, in response to the low marking material signal, transmits information relating to an amount of marking material for the job of image data. The receiver enables the rendering of the job of image data when it is determined that the amount of marking material for the job of image data is less than the amount of marking material available.

8 Claims, 4 Drawing Sheets

SYSTEM AND METHOD FOR OVERRIDING A LOW MARKING MATERIAL STATUS IN A FACSIMILE ENVIRONMENT

FIELD OF THE PRESENT INVENTION

The present invention is directed to overriding a state indicating low marking material in a facsimile environment. More specifically, the present invention is directed to a system and method for overriding a receiver's indication of a low ink status state when attempting to transmit a document from a transmitter to a thermal ink jet facsimile receiver.

BACKGROUND OF THE PRESENT INVENTION

Conventionally, an ink jet facsimile receiver operates during a facsimile transmission according to the flow chart illustrated in FIG. 1. More specifically, as illustrated in FIG. 1, the ink jet facsimile receiver remains idle until a transmission signal is received at step S1 from a facsimile transmitter. In other words, the facsimile transmitter must first properly activate the receiver, usually through a telephonic calling procedure wherein the ringing signal from a central switching station activates the receiver. To ensure a proper facsimile transmission, the receiver and transmitter sends signals back and forth in a handshake manner so as to establish the facsimile connection.

Once a facsimile connection has been established at step S1, the receiver determines at step S3 whether the receiver is in a low ink status state. If the receiver is not in a low ink status state, the receiver will begin accepting the transmitted data at step S7 and print or store the received data. However, if the receiver is in a low ink status state and the receiver has no auxiliary memory to store the incoming data, the receiver sends a message, at step S5, to the transmitter terminating the facsimile connection.

On the other hand, if the facsimile receiver has an auxiliary memory, the receiver can instead of terminating the facsimile connection, merely store the incoming data in the memory so as to print the data later when the ink status is more conducive to printing such a document.

A problem, associated with having such a low ink status protection feature and no auxiliary memory is that when the receiver enters a low ink status state, the facsimile receiver is now inoperable until the ink supply is replenished. However, a low ink status state does not necessarily indicate a full depletion of the ink in the facsimile receiver, but usually indicates that a small reserve of ink is left in the ink cartridge so that only a limited number of pages can be printed with this supply. This protection is triggered at a level above total empty so as to statistically insure that all incoming jobs can be printed with a predetermined confidence. Thus, in the conventional devices, the low ink status feature prevents the printing of many small jobs whose ink requirements are less than the amount of ink remaining in the ink cartridge when the low ink status state is triggered.

Another problem with some conventional facsimile machines, especially inkjet, is the running out of resources used to reproduce the document, namely marking material or paper, during the receipt of a document. With respect to some conventional inkjet facsimile machines, when the marking material, ink, is depleted, the fax machine will continue its mechanical process of printing the document without imparting any marking material onto the paper. Upon completion, the machine will inform the sender that the document was properly received and reproduced, thereby incorrectly informing the sender of the status of the transmission and giving the sender a false sense of security. In other words, the sender is not notified of the true situation.

On the other hand, other conventional fax machines terminate the printing process when the supplies for reproduction are depleted and abort the facsimile process. This causes aggravation to the sender because the documents must be sent again at a later time. This also causes aggravation to the receiver because the aborted transmission wastes rendering supplies and possibly prevents other important smaller transmissions from being received.

In view of these problems with conventional facsimile systems, the present invention proposes a system which overrides the low ink status state such that a user can transmit a small documents (documents with a small number of sheets) to the receiving device when the ink requirements for the smaller documents would be less than the reserved amount still present in the ink cartridge and prevents the transmission of documents which cannot be completely reproduced by the receiver.

SUMMARY OF THE PRESENT INVENTION

One aspect of the present invention is a method of overriding a low material mode during a transmission of a job of image data to a printing device. The method includes the steps of receiving a low material status signal from the printing device, sending an override request to the printing device, sending information corresponding to an amount of image data within the job to be sent to the printing device, determining if the amount of image data is greater than an amount of marking material at the printing device, and printing the job of image data when the process determines that the amount of image data is less than or equal to the amount of marking material at the printing device.

Another aspect of the present invention is a method of verifying resources for carrying out a facsimile transmission. The method includes the steps of pre-scanning an entire document to be transmitted to the receiving station; sending information corresponding to a number of pages to be transmitted and a number of pixels to be printed; determining if an amount of marking material at a receiving station is greater than or equal to the amount of marking material needed to print; and printing image data transmitted from a transmitting station when the process determines that the amount of marking material is greater than or equal to the number of pixels to be printed.

A third aspect of the present invention is a system for overriding a low material mode. The system includes transmitter means for initiating a transmission and for transmitting a job of image data and receiver means for establishing the transmission and for receiving the job of image data. The receiver means includes marking material status means for determining an amount of marking material available and for producing a low material signal indicating a low marking material status when the amount of marking material is below a predetermined value, override means for overriding the low marking material status, and print means for rendering the job of image data onto a recording medium. The receiver means transmits a low marking material signal to the transmitter means, and the transmitter means, in response to the low marking material signal, transmits information relating to an amount of marking material for the job of image data. The override means enables the print means to render the job of image data when a comparison shows that the amount of marking material for the job of image data is less than the amount of marking material available.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
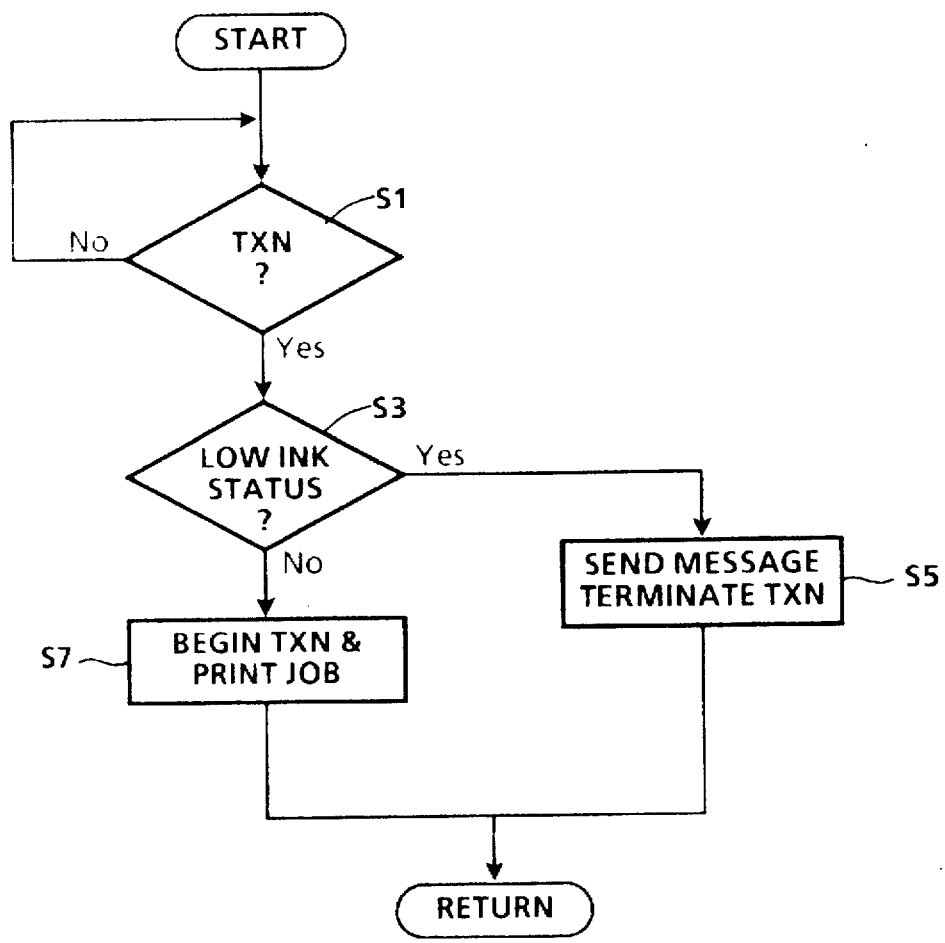
FIG. 1 is a flowchart illustrating a conventional method of carrying out a facsimile transmission.

For a general understanding of the facsimile override system incorporating the various features of the present invention, reference is made to the drawings. In the drawings and in the specification, like reference numerals have been used through out this description to designate identical or equivalent elements or steps.

Figure 4:
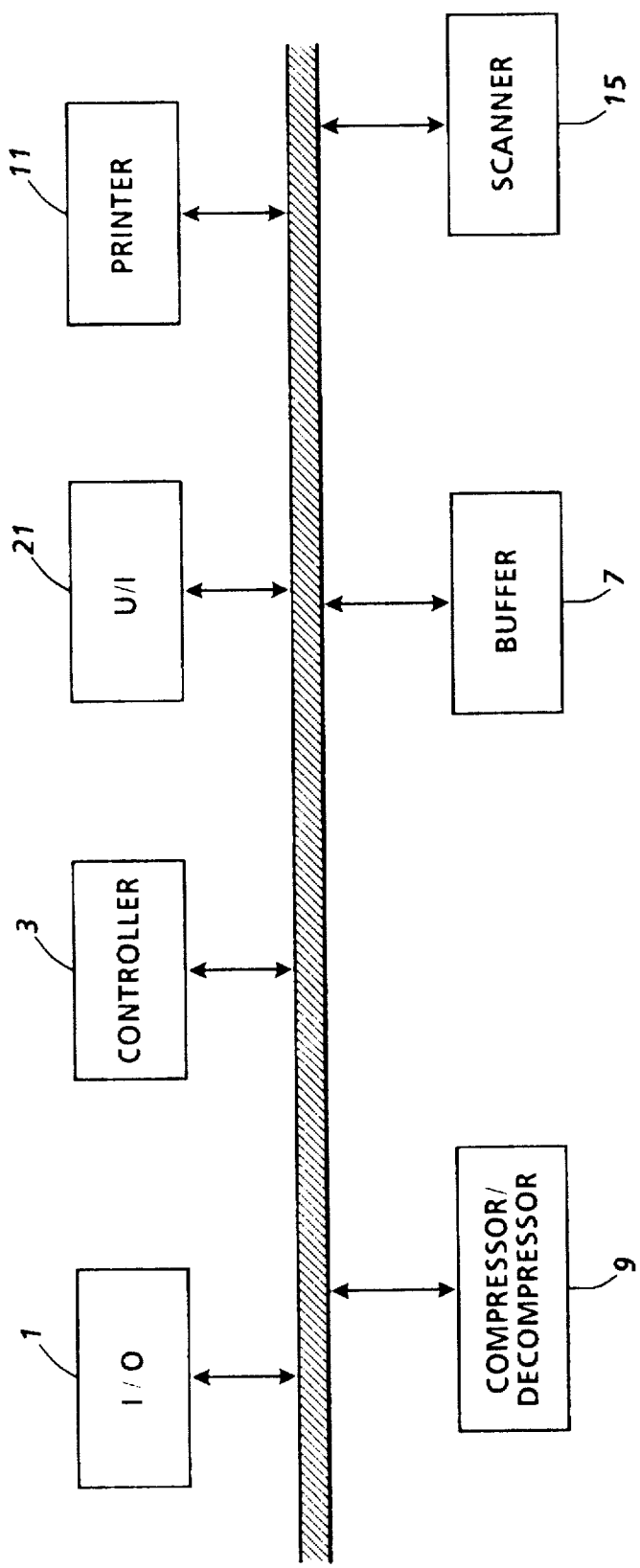
FIG. 4 is a block diagram illustrating the overall architecture of the facsimile system of the present invention.

As noted above, FIG. 4 illustrates an overall architecture for the facsimile system of the present invention. In the facsimile system of the present invention, an input/output circuit (I/O port) 1 connects the facsimile system to a network or local telecommunication channel or line so that the facsimile system can transmit and receive image data. The facsimile system further includes a compressor/decompressor 9 which compresses the image data prior to the image data being transmitted through the I/O port 1 to another facsimile system, remote or local printer, or other network citizen device and decompresses the image data received through the I/O port 1 from another facsimile system or network citizen device.

A buffer 7 is included in the facsimile system to provide the necessary buffering of the image data as it is received from outside the facsimile system or prior to being transmitted out of the facsimile system through the I/O port 1. A scanner 15 is utilized by the facsimile system to scan in the image from a hard copy and to convert this image into electronic or optical image data for transmission through the I/O port 1. In conjunction with the scanner 15, a printer or image output terminal 11 is included to generate or render a hard copy of the image data received through the I/O port 1.

Lastly, the facsimile system includes a controller 3 which controls the overall operations of the facsimile system so as to coordinate the various operations between the individual components described above and their operations with devices outside the facsimile system, and a user interface (U/I) 21 which enables the user to input the number pages to be transmitted or to initiate the pre-scan operations and to display the low marking material warning from the receiver. It is noted that the I/O port 1, the controller 3, the printer 11, the compressor/decompressor 9, the buffer 7, and the scanner 15 can be all interconnected to each other through a bi-directional bus or buses within the facsimile system.

Figure 2:
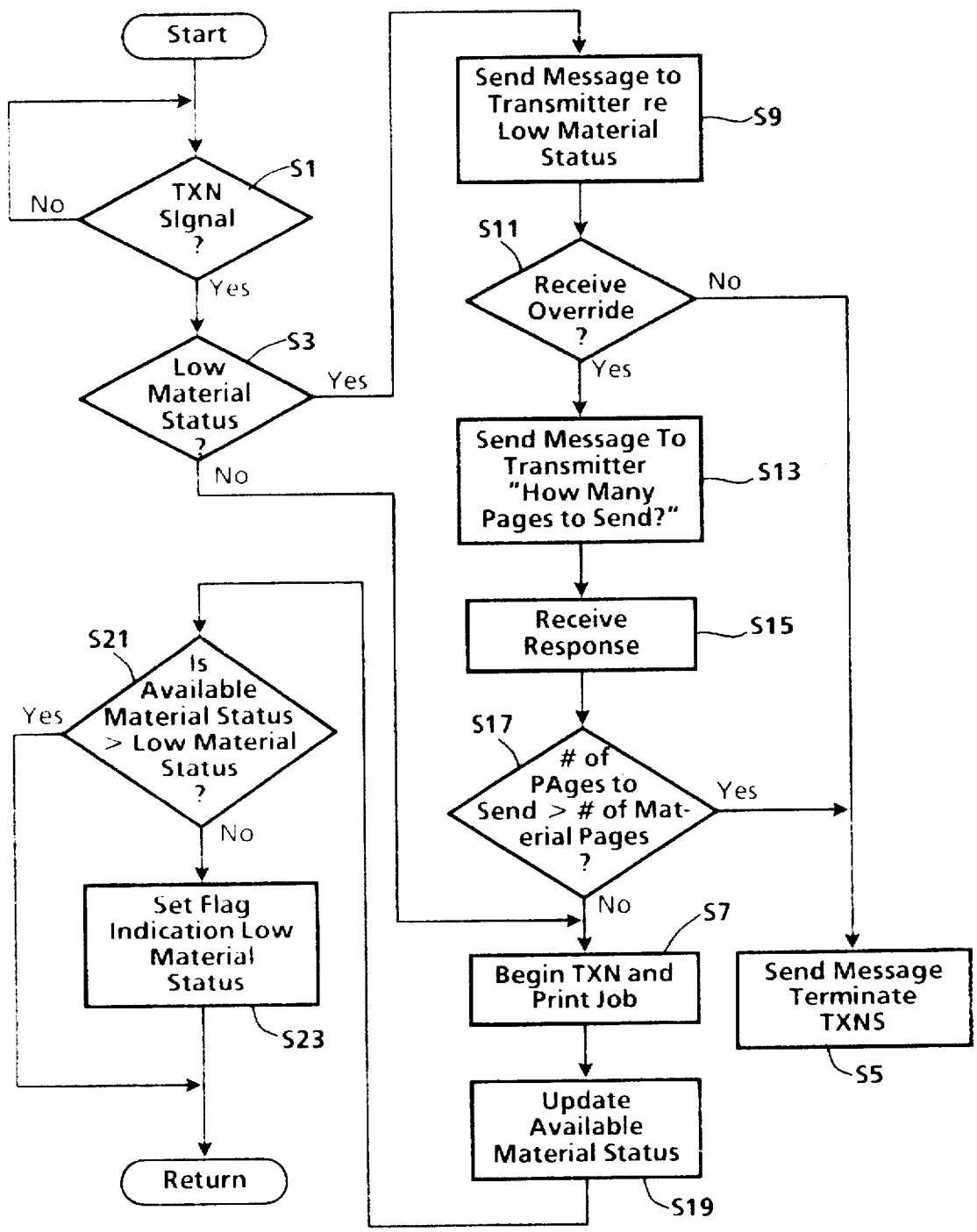
FIG. 2 is a flowchart illustrating a method of overriding a low ink status in a receiver according to one embodiment of the present invention.

FIG. 2 illustrates a flowchart showing a method of overriding a low material status state according to one embodiment of the present invention. In this process, it is determined whether a facsimile connection is established at step S1. If the facsimile connection is established, the receiver determines at step S3 whether the receiver is in a low material status state. If the receiver is in a low material status state, the receiver sends a message to the transmitter indicating such a low material status state at step S9.

After sending the message to the transmitter, the receiver is put into a temporary wait state so as to enable the transmitter to react to the message of the low material status. During this wait state, the receiver monitors the transmission lines to determine if an override signal has been transmitted by the transmitter.

If an override signal has been received at step S11, the receiver sends a message to the transmitter asking how many pages the transmitter intends to send to the receiver at step S13. In response to this inquiry, the receiver receives a numeric response at step S15 indicating the number of pages to be sent by the transmitter. The number of pages to be sent by the transmitter is compared with the number of marking material pages remaining in the marking material supply of the receiver at step S17.

This comparison can be carried in many different ways. For example, the facsimile system of the present invention can utilize a conventional system of tracking the amount of marking material that has been used and the number of pages that have been reproduced. From these figures, an average coverage per page (average amount of marking material per page) can be dynamically determined which can then be used to calculate the approximate number of pages left in the marking material supply.

If the number of pages to be sent by the transmitter is less than or equal to the number of marking material pages remaining in the marking material supply of the receiver, the receiver allows the transmission of image data to begin and prints the job at step S7. On the other hand, if the number of pages to be sent by the transmitter is greater than the number of marking material pages, the receiver sends a message to the transmitter indicating that this transmission cannot be properly processed by the receiver and terminates the transmission at step S5. Moreover, if the receiver does not receive an override signal during the temporary wait state (after a predetermined period of time), the receiver will send a message to the transmitter terminating the facsimile connection at step S5, or if the receiver has memory capabilities, the receiver will divert the transmitted document to its memory for proper storage.

After printing the job corresponding to the received image data, the receiver updates the amount of available marking material at step S19. After updating the amount of available marking material, the receiver determines whether the amount of available marking material is greater than a value indicating a low material status at step S21. If the amount of available material is less than or equal to the value corresponding to the low material status, the receiver sets an internal flag at step S23 indicating a low material status. It is noted that step S19 not only updates the value for the available material in the facsimile machine, but updates the value of the number of material pages remaining in the facsimile machine.

In other words, if the amount of material remaining in the machine corresponding to the low material status states represents a total of ten material pages, and the number of pages sent by the transmitter in overriding the low material status corresponds to six marking material pages (using the convention discussed above), step S19 updates the number of material pages for the receiver to be equal to four. By updating the number of material pages remaining in the receiver, the low material status state can be overridden a second time during a subsequent facsimile transmission wherein the transmitter wishes to send four or less pages to the receiver.

Figure 3:
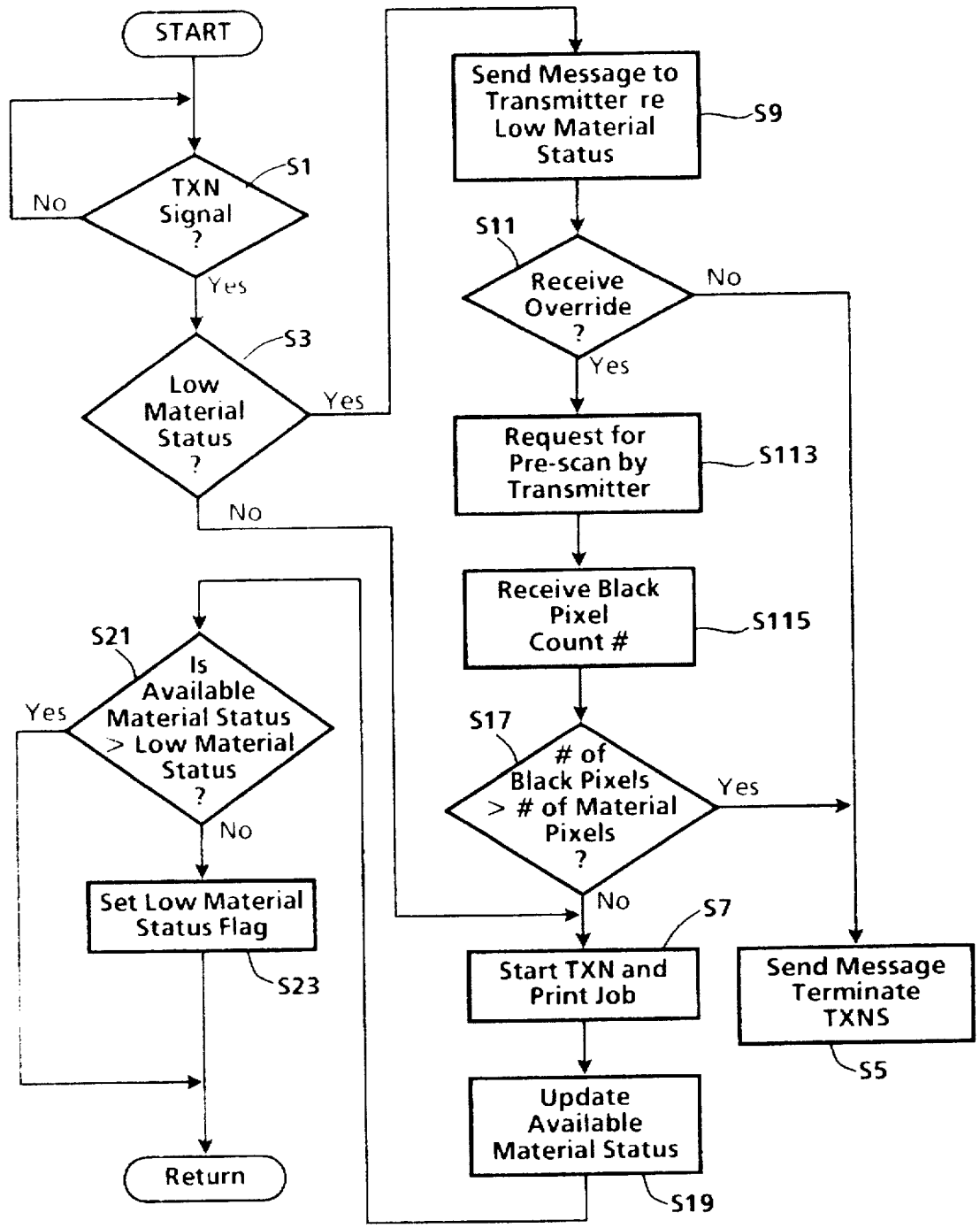
FIG. 3 is a flow chart illustrating a method for overriding a low ink status in a receiver according to another embodiment of the present invention.

FIG. 3 illustrates a flowchart showing a method for overriding a low material status state in a receiver according to a second embodiment of the present invention. At step S1, it is determined whether a facsimile connection has been established between a receiver and a transmitter. Upon establishing a facsimile connection, step S3 determines whether a receiver is in a low material status state. If the receiver is in a low material status state, the receiver sends a message to the transmitter indicating the low material status at step S9.

After sending the message to the transmitter indicating the low material status state, the receiver is put into a temporary wait state wherein step S11 monitors the transmission line for the receipt of an override instruction from the transmitter. If an override instruction is received during the temporary wait state, the receiver sends a message to the transmitter requesting a pre-scan of the document or documents to be sent to the receiver at step S113. In response to the request from the receiver, the transmitter pre-scans the documents through an input scanner such that the image data can be sent to the receiver. This image data is received by the receiver in the form of white and black or grey scale pixels at step S115.

At step S115, the number of black or grey pixels received from the transmitter are processed and counted to arrive at a number representative of the amount of marking material that would be required to print the documents at the receiver.

This calculation can be carried out by deriving the material needed value which can be realized by integrating or summing the black video signal and then dividing this result by a clock signal equal to or proportional to the amount of material needed to print a pixel of black data. The resultant number would be equal to how much is required to print a particular document sheet.

There are many conventional ways of determining how much black or print areas are on an original. An example of such a system is disclosed in U.S. Pat. No. 4,961,088. The entire contents of U.S. Pat. No. 4,961,088 are hereby incorporated by reference.

As disclosed in U.S. Pat. No. 4,961,088, the conventional printing system uses a digital image generator to generate the image to be printed as an electronic pixel stream, which is tapped and sent to be both frequency or rate analyzed and also counted with a weighting factor assigned by the frequency analysis, to obtain a weighted pixel count. This provides a toner consumption estimate calculation which in turn can be subtracted from the (known) original amount of toner in the toner container to determine the remaining amount of toner and provide a signal indicating a low marking material condition.

In other words, a toner cartridge comes pre-filled with a specified (known constant) initial amount of toner, which is known to the printer in the system. That number is stored as a weighted pixel count in ROM, EPROM, or other non-volatile memory. As each page is printed, the pixel frequency is monitored for that page, and an estimation of the average image type is determined for that page. The number of pixels per page is then assigned a weight per pixel. This calculated toner amount is subtracted from the remaining balance of toner. This new toner amount balance value is saved. The next page of pixels is then calculated and subtracted from this value. This process continues until the warning level for remaining toner is attained. The user is then alerted that the toner cartridge is nearing it's "end-of-life" condition. The process continues until a calculated remaining toner amount of zero is attained, which should coincide with the toner cartridge being empty. That is, continuously subtracting calculated toner usage this way from the known initial installed toner amount until the balance amount reaches zero automatically gives an "out of toner" indication, without ever actually sensing or examining the toner container itself.

Other examples of conventional systems which calculate how much of a document will be rendered are U.S. Pat. Nos. 5,283,613; 5,204,699; 5,204,698; 3,409,901; 4,847,659; 4,468,112; and 4,908,666. The entire contents of U.S. Pat. Nos. 5,283,613; 5,204,699; 5,204,698; 3,409,901; 4,847,659; 4,468,112; and 4,908,666 are hereby incorporated by reference.

The receiver, as illustrated in FIG. 3, then compares that number with the amount of marking material remaining in the receiver at step S117. If the amount of material to be utilized in the present transmission is less than or equal to the amount of material remaining in the receiver, the receiver will inform the transmitter to transmit the documents at step S7 and upon receipt of the image data, the receiver will produce a hard copy of the transmitted documents at step S7. On the other hand, if the amount of material required by the documents to be transmitted is greater than the amount of material remaining in the receiver, the receiver sends a message to the transmitter at step S5 indicating that the facsimile connection will be terminated or if the receiver has memory capabilities, the receiver will divert the transmitted document to its memory for proper storage.

After making a hard copy of the transmitted data, the amount of marking material available in the receiver is updated at step S19. After updating the amount of available material, the receiver determines whether the remaining amount of material is greater than a value representing a low material level status at step S21. As in the process illustrated in FIG. 2, if the amount of available ink is less than or equal to the value representing a low material level status, step S23 sets a low material status flag indicating such a status.

According to one embodiment of the present invention, the present invention allows a sender, in response to low material status at the receiver, to input via the user interface keypad at the transmitter, the number of document sheets desired to be sent so that the receiver can decide whether or not its remaining material supply is sufficient to print the desired number of document sheets.

According to another embodiment of the present invention, the transmitter scans the document sheets and arrives at a number more closely representative of the total black or grey content of the sheets to be sent. The present invention then makes a more precise determination if the receiver has a sufficient material supply to receive the sheet's images and print them.

Although the present invention has been described with respect to marking materials, the present invention is equally applicable to other aspects of a facsimile operation. For example, the present invention can be used to override a low paper status or a low memory status.

Moreover, the present invention is also applicable to a color system. In such a system, each color would have one of the processes described above associated therewith and would be carried out in parallel to determine the status for each color marking material.

Also, the present invention can be carried out in software by an appropriate processor, or the present invention can be realized in a hardwired circuit which carries the functions described above.

Lastly, the present invention can be easily modified to be incorporated into a network environment or other printing system. In such a system, the sender or user requesting the printing operation can caused data, indicating the material to be used by the job, to be sent to the printing machine so that the printing machine can determine if the material status of the job is less than or equal to the material available at the printing machine. In this way, a low material status at a printer, network printer, or other network citizen device can be overridden by an appropriate sized job.

While the invention has been described with reference to various embodiments disclosed above, it is not confined to the details set forth above, but is intended to cover such modifications or changes as may come within the scope of the attached claims.

What is claimed is:

1. A method of overriding a low marking material mode during a transmission of a job of image data to a printing device, comprising the steps of:
   (a) receiving a low marking material status signal from the printing device;
   (b) sending an override request to the printing device;
   (c) sending information, to the printing device, corresponding to an amount of image data within the job to be sent to the printing device;
   (d) determining, from the sent information corresponding to the amount of image data within the job, if an amount of marking material required for rendering the image data is greater than an amount of marking material available at the printing device; and
   (e) printing the job of image data when said step (d) determines that the amount of marking material required for rendering is less than or equal to the amount of marking material available at the printing device.

2. The method as claimed in claim 1, further comprising the step of:
   (f) terminating the transmission of image data when said step (d) determines that the amount of marking material required for rendering is greater than the amount of marking material available at the printing device.

3. The method as claimed in claim 1, wherein said step (c) includes the substep of:
   (c1) inputting a number of pages of the job.

4. The method as claimed in claim 1, wherein the transmission is a facsimile transmission of a job of image data and wherein said step (c) includes the substeps of:
   (c1) pre-scanning an entire document to be transmitted to the printing device;
   (c2) determining a number of pixels to be printed from an electronic image of the pre-scanned document; and
   (c3) sending to the printing device information representing a number of pixels to be printed.

5. The method as claimed in claim 1, further comprising the step of:
   (f) storing the job of image data when said step (d) determines that the amount of marking material required for rendering is greater than the amount of the marking material available at the printing device.

6. A method of verifying resources for carrying out a facsimile transmission, comprising the steps of:
   (a) pre-scanning, at a transmitting station, an entire document to be transmitted to a receiving station;
   (b) sending, to the receiving station, information generated from the pre-scanning of said step (a) corresponding to a number of pages to be transmitted and a number of pixels to be printed;
   (c) determining, from the sent information corresponding to the number of pages to be transmitted and a number of pixels to be printed, if an amount of marking material at the receiving station is greater than or equal to an amount of marking material needed to print the number of pixels; and
   (d) printing, at the receiving station, image data transmitted from the transmitting station when said step (c) determines that the amount of marking material at the receiving station is greater than or equal to the amount of marking material needed to print the number of pixels.

7. The method as claimed in claim 6, further comprising the step of:
   (e) terminating the facsimile transmission when said step (c) determines that the amount of marking material at the receiving station is greater than or equal to the amount of marking material needed to print the number of pixels.

8. The method as claimed in claim 6, further comprising the step of:
   (e) storing the job if image data when said step (c) determines that the amount of marking material at the receiving station is greater than or equal to the amount of marking material needed to print the number of pixels.

* * * * *